US012705682B2

(12) United States Patent
Oboril et al.

(10) Patent No.: US 12,705,682 B2
(45) Date of Patent: Aug. 11, 2026

(54) REAL-TIME SITUATIONAL PLANNING FOR PASSENGER TRANSPORT

(71) Applicant: Intel Corporation, Santa Clara, CA (US)

(72) Inventors: Fabian Oboril, Karlsruhe (DE); Frederik Pasch, Karlsruhe (DE); Cornelius Buerkle, Karlsruhe (DE)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 17/955,549

(22) Filed: Sep. 29, 2022

(65) Prior Publication Data

US 2024/0112290 A1 Apr. 4, 2024

(51) Int. Cl.
*G06Q 50/40* (2024.01)

(52) U.S. Cl.
CPC .................................... *G06Q 50/40* (2024.01)

(58) Field of Classification Search
CPC ............. G06Q 50/40; G06Q 10/06312; G06Q 10/06313
See application file for complete search history.

(56) References Cited

U.S. PATENT DOCUMENTS 5,176,082 A * 1/1993 Chun ........................ B61B 1/02 105/341.5
11,023,809 B2 * 6/2021 Böhm .................... G06Q 10/06
2010/0036688 A1 * 2/2010 Sethna .................. G06Q 10/02 705/5
2014/0125355 A1 * 5/2014 Grant ................ B64D 11/0647 324/629
2015/0268052 A1 * 9/2015 Berczi .................. G01C 21/343 701/408
2022/0351104 A1 * 11/2022 Lodhia ............... G06Q 10/0631
2024/0037460 A1 * 2/2024 Dahbali ............... G06Q 10/025

OTHER PUBLICATIONS

Xovis, "Bring your operations to the next level with our 3D sensor for APC", https://www.xovis.com/insights/bring-your-operations-to-the-next-level-with-our-3d-sensor-for-apc, downloaded on Sep. 14, 2022, 2 pages.

(Continued)

*Primary Examiner* — Omeed Alizada
(74) *Attorney, Agent, or Firm* — Viering, Jentschura & Partner mbB

(57) ABSTRACT

Disclosed herein are systems, devices, and methods for monitoring and improving utilization of a public transport vehicle. The transport control system determines an in-vehicle status of a passenger transport vehicle based on in-vehicle sensor data about an interior of the passenger transport vehicle. The transport control system also determines a station status at a station stop for the passenger transport vehicle based on station sensor data about the station stop. The transport control system also determines a situational status based on the in-vehicle status and the station status. The transport control system also generates a notification message with movement control information for the passenger transport vehicle or for a passenger, wherein the movement control information is based on the situational status.

20 Claims, 4 Drawing Sheets

(56) References Cited

OTHER PUBLICATIONS

Deutsche Bahn, "How full is my train? Information about seat availability", https://www.bahn.com/en/booking-information/how-full-is-my-train, downloaded on Sep. 14, 2022, 3 pages.
Xovis, "Customer counting for retail", https://www.xovis.com/solutions/retail, downloaded on Sep. 14, 2022, 4 pages.
A. H. Lang et al. "PointPillars: Fast Encoders for Object Detection from Point Clouds", nuTonomy: an APTIV company, dated May 7, 2019, 9 pages.

* cited by examiner

REAL-TIME SITUATIONAL PLANNING FOR PASSENGER TRANSPORT

TECHNICAL FIELD

The disclosure generally relates to planning for public transportation systems, and in particular, to devices, methods, and systems that monitor the utilization of passenger transport vehicles and provide recommendations for controlling passenger movement and/or vehicle utilization in order to improve the overall efficiency of the public transportation system.

BACKGROUND

Public transportation systems are a ubiquitous part of daily life, especially in larger cities, where busses, subways, trains, boats, and trams may service a large population of riders. As ridership and utilization increases, so does the likelihood that the flow of passengers becomes disrupted by crowds of people attempting to exit and enter vehicles, by the blockage of doors/pathways by people or luggage, or by the shuffling of passengers within the vehicle who are hoping to find a more pleasing location. When such disruptions occur, passenger movement may be slowed, which may cause problems such as inefficiencies in the utilization of the public transport vehicle, delays in the scheduled times for embarking/disembarking the vehicle, or passenger frustration, just to name a few. One common example of such an inefficiency problem may be a public transport vehicle where one part of the vehicle is overcrowded with passengers that are blocking entry/exit doors and aisles, while another part of the vehicle may be only lightly populated. This creates an unnecessary inefficiency at the jammed part of the vehicle, where it may take longer for passengers to enter/exit the crowded part of the vehicle, as compared to other parts of the vehicle where there is excess capacity. This imbalance may lead to, for example, the vehicle having to remain at the station stop longer than necessary in order to allow all of the passengers to embark, or some passengers having to wait for the next transport vehicle because they were not able to board during the time allotted for the station stop.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
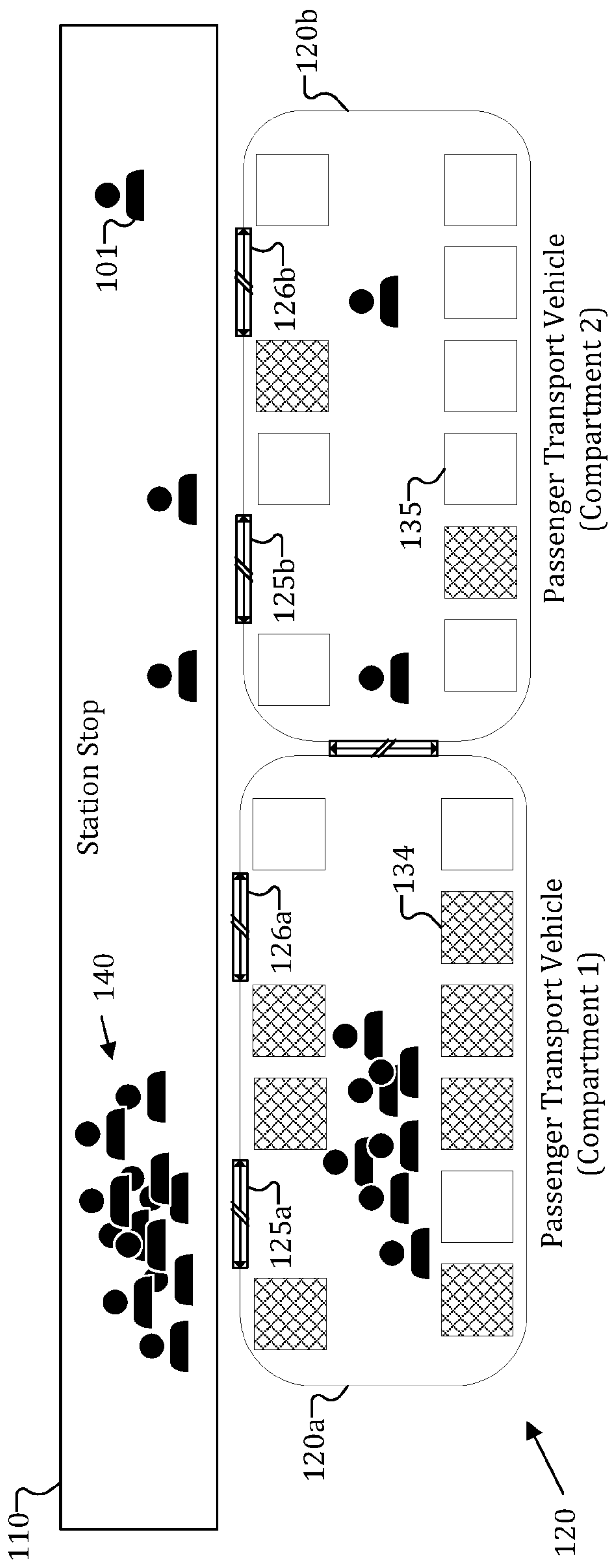
FIG. 1 shows an exemplary public transportation scenario, where a transport vehicle has imbalanced utilization and unnecessary passenger crowding.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements] ") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D) XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and "indirect" calculations via lookup or hash tables and other array indexing or searching operations.

A "passenger transport vehicle" may be understood to include any type of vehicle designed to move one or more passengers from one location to the next. By way of example, a passenger transport vehicle may be a bus, a train, a car, a van, an airplane, a boat, a robot, etc., where the vehicle makes one or more stops to allow passengers to embark and disembark. As should be appreciated, while reference is made to "public" transport throughout the specification, such passenger transport vehicles and systems are not limited to public transportation and may also encompass vehicles provided by private/commercial passenger services, including, as examples, commercial buses, commercial airlines, commercial shared-ride vehicles, etc.

Due to the multi-passenger nature of passenger transport vehicles, it may be important to ensure efficient utilization of the passenger transport vehicle. The efficiency of utilization may be measured in any number of ways, including, for example, in terms of capacity (e.g., available passenger seats/space, available luggage space, etc.) compared to demand (e.g., number of travelers, amount of luggage, etc.), in terms of the time needed for passengers to enter/exit the vehicle at a station stop compared to target time allowed for the station stop, in terms of customer expectations compared to actual experiences, etc. Public transportation often involves a dynamic situation, where the number of passengers, the origin and destination of passengers, the amount of luggage carried by passengers, which seats or passenger areas are occupied, the preference of passengers, etc., making it difficult to ensure efficient usage of public transport vehicles. As ridership increases, so does the likelihood that the flow of passengers becomes disrupted by crowds of people attempting to exit and enter vehicles, by the blockage of pathways by people or luggage, or by passengers shuffling themselves around the vehicle in order to find a more preferred type of location. When such disruptions occur, passenger movement may be slowed, which may cause inefficiencies in capacity utilization, in timing utilization, in terms of passenger satisfaction, etc.

FIG. 1 shows one such example of the inefficient use of a public transport vehicle that may occur in a dynamic situation. FIG. 1 depicts a station stop and platform 110 where a number of passengers (one of which has been labeled as passenger 101 and a crowd of which has been labeled as crowd 140) may be waiting to board an arriving train 120. The arriving train 120 may be divided into multiple sections/compartments, such as compartment 120*a* and compartment 120*b*, accessible by different doors/passageways from the platform 110, where compartment 120*a* is accessible by doors 125*a* and 126*a* and where compartment 120*b* is accessible by doors 125*b* and 126*b*. Train 120 may have seats (depicted by squares, where a shaded square indicates an occupied seat, such as seat 134, and where a non-shaded square indicates an available seat, such as seat 135). Train 120 may also have passengers standing in the aisles/passageways within train 120.

As depicted in FIG. 1, train 120 may have imbalanced utilization, where compartment 120*a* has a higher occupancy and utilization than compartment 120*b*. For example, in compartment 120*a,* 7 of the 10 available seats are occupied and there are 7 standing passengers that may be blocking the aisles of compartment 120*a*, crowded close to door 125*a*. By contrast, compartment 120*b* is less utilized, where only 2 of the 10 available seats are occupied and there are only 2 standing passengers. On the platform 110, crowd 140 of passengers have positioned themselves to enter compartment 120*a* through door 125*a*. Unfortunately, given the high occupancy of compartment 120*a*, there may not be enough room to accommodate all of the passengers, or if passengers within compartment 120*a* plan to exit train 120 through door 125*a*, the flow of passengers through door 125*a* may take longer than expected, as passengers move along platform 110 hoping to find a less crowded compartment and/or a door that is not blocked. The passengers on the right side of platform 110, including passenger 101, for example, may board much more quickly because they are waiting at a location along the platform 110 where compartment 120*b* has doors 125*b* and 126*b* that are not blocked and compartment 120*b* has more seats/space available to accommodate boarding passengers. These imbalances between may mean that train 120 must remain at the station stop for longer than would otherwise be necessary or that some passengers (e.g., in crowd 140) may not be able to board train 120 if compartment 120*a* reaches capacity and they were unaware that they could have moved along platform 110 towards compartment 120*b*, which would have been able to accommodate them.

Unfortunately, such inefficiencies are common in today's public transport systems. While some public transport systems may collect some utilization information, such as using entry/exit counters at station entrances, these counters only provide a snapshot of usage and provide no insight into where passengers are located within a particular transport vehicle, how passengers may be moving, or where passengers may be headed. Other systems may collect reservation/booking information to predict utilization of available capacity on a given route, but again, this information provides no insight into how whether the passengers actually appeared for their booking, how much luggage they bring, and where passengers without a reservation are sitting. Without this information, passengers boarding the vehicle may not know where to find an open compartment or open seat.

As should be apparent from the detailed disclosure below, the disclosed transport control system may improve such inefficiencies by determining the current utilization of a vehicle, predicting the utilization demands for the vehicle, and controlling the movement of the vehicle and/or passengers to balance available supply with passenger demands. The disclosed transport control system may combine information about the status inside the vehicle with information about the status at the station stop to determine current utilization, the upcoming demand at the next station stop(s), and provide real-time recommendations for passengers already within the vehicle, for future passengers that may be boarding the train (e.g., to find the best place to enter the vehicle or whether an alternative transportation solution would be better), for the vehicle to plan stop durations or the positioning of compartments at a station stop, etc. The disclosed transport control system may combine information gathered from in-vehicle sensors, from at-station sensors, and from transportation applications (e.g., mobile apps) and booking systems to determine current utilization of the vehicle using precise location (e.g., at the compartment, coach, seat, etc. level). By providing real-time movement control commands and recommendations to the vehicle and/or passengers, the transport control system may help accelerate entry/exit from the vehicle, avoid disruptive crowding, help passengers find more preferred locations, etc.

Figure 2:
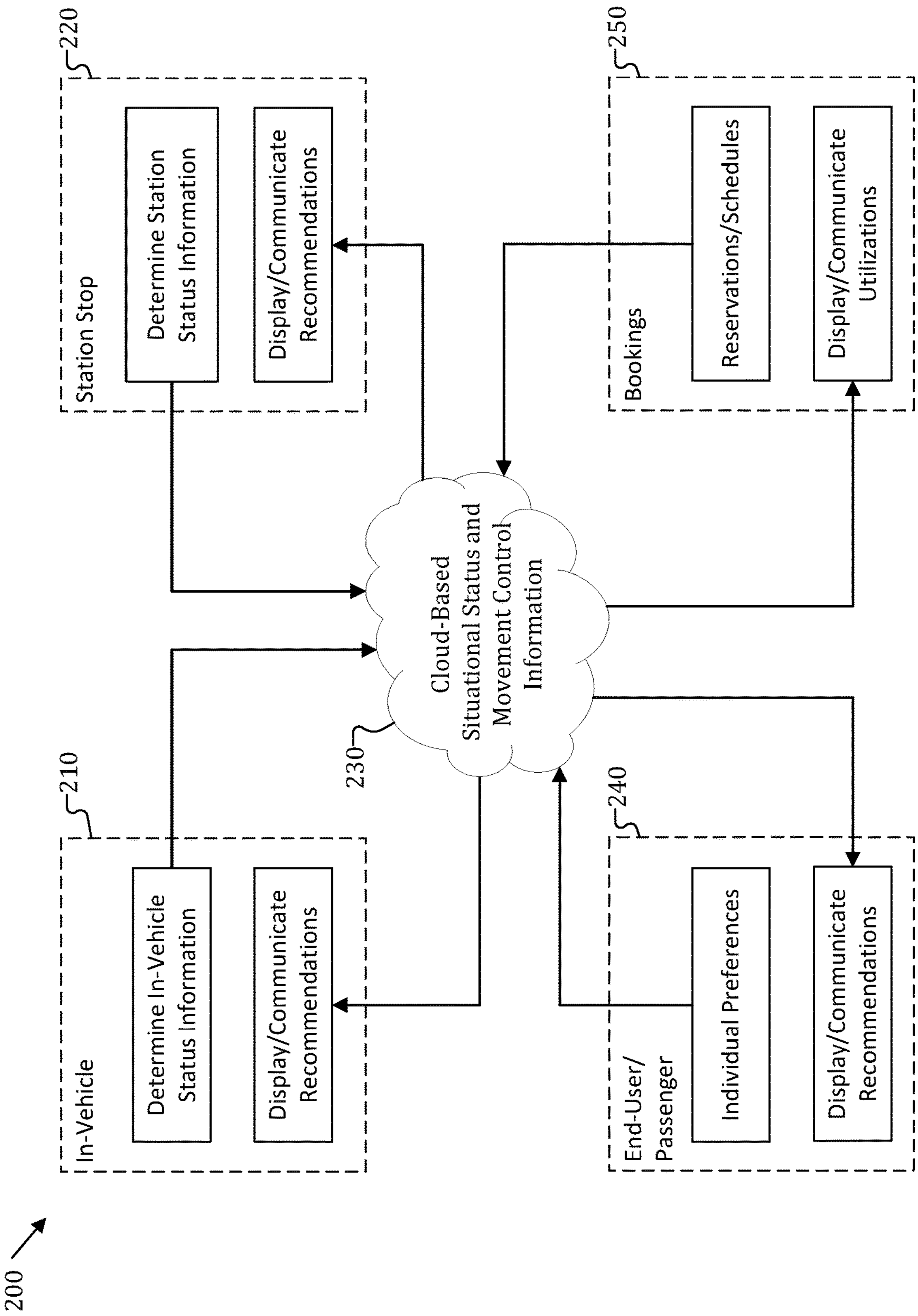
FIG. 2 depicts an exemplary transport control system that may be used to monitor and improve utilization of a public transport vehicle.

FIG. 2 depicts a transport control system 200 that may be used to monitor and improve utilization of a public transport vehicle. As will be discussed in more detail below, the transport control system 200 may be logically divided into five different subsystems or circuits, including an in-vehicle subsystem 210, a station stop subsystem 220, an end-user subsystem 240, a booking subsystem 250, and a cloud-based subsystem 230. As should be apparent, these "subsystems" are simply logical groupings to aid in describing the functionality of the overall system. The transport control system 200 need not divide/distribute the provided functionality into such a strict physical, logical, or compartmentalized subsystems, and the features described below with respect to each logical grouping may be combined with one another or subdivided from one another in any way. As should also be appreciated, transport control system 200 need to provide all the features of every subsystem, and some, all, or none of the features for a given subsystem may or may not be present in different embodiments of transport control system 200.

At a high level, the cloud-based subsystem 230 aggregates information (e.g., in real time or at regular or irregular intervals) from multiple sources (e.g., in-vehicle, at the station stop, from end-users/passengers, from bookings/reservations, etc.) in order to determine information about the situational status of the passenger transport vehicle, station stops, passengers, and reservations/schedules. The cloud-based system 230 may then generate, based on the aggregated situational status information, movement control information in the form of recommended actions for the vehicle and/or passengers that may be designed to improve efficiencies in capacity utilization, timeliness, and/or passenger satisfaction. The cloud-based subsystem 230 may then provide the recommended actions to the passengers (e.g., on a display screen within the vehicle or at the station, via an audible announcement within the vehicle or at the station, on an application of a mobile device, in a web browser, etc. or to the vehicle (e.g., as motion control instructions for adjusting the wait time at a station, the positioning of the vehicle at the station, the capacity of the vehicle, etc.). As should be appreciated, while the term "cloud-based" has been used to describe subsystem 230, this is not intended to be strictly limited to a cloud-based or edge-based server, but is instead simply meant to indicate an aggregation of data. This may be done most easily using a cloud-based or edge-based server that is in communication with each of the subsystems, but the aggregation of data may occur in other locations (such as at the station, in the vehicle, or in a distributed manner across multiple locations).

The cloud-based subsystem 230 may receive and provide information to the in-vehicle subsystem 210. The in-vehicle subsystem 210 may utilize sensor data (e.g., from in-vehicle sensors) to detect and track passengers, luggage, and/or animals that may enter, exit, or move within the vehicle. The in-vehicle subsystem 210 may receive sensor data from camera sensors (e.g., by utilizing the existing security cameras or by deploying other cameras/sensors), Light Detection and Ranging (LiDAR) sensors (e.g. running an AI-based detector), Wi-Fi sensors (e.g. sensors that can count the number of Wi-Fi devices in a proximate area), red-green-blue (RGB) cameras, depth cameras, radar sensors, infrared sensors, ambient noise sensors, ambient light sensors, etc. As should be appreciated, the in-vehicle subsystem 210 need not specifically identify individuals, and may be understood to be designed to detect, track, and predict paths of passengers, no matter the identity of the passenger. Thus, privacy of the collected information may be maintained.

Based on the sensor information, the in-vehicle subsystem 210 may determine, predict, and monitor (e.g., in real-time) the in-vehicle status information at a very precise level, such as at compartment level (e.g., units, cars, coaches, etc. of the vehicle), seat level, pathway level, and/or any area/volume of space within the vehicle. The in-vehicle subsystem 210 may also determine other types of real-time status information, including for example, the number of passengers currently located within a restaurant of the vehicle and the anticipated wait time for the next available seat or seats. The in-vehicle subsystem 210 may also determine whether passengers may be traveling together as a group of travelers who may require more than a single space/seats together.

The in-vehicle subsystem 210 may provide this in-vehicle information to the cloud-based subsystem 230, which may use the information (along with other information, such as information received from the station stop subsystem 220, the end-user subsystem 240, and/or the booking subsystem 250) to determine an overall situational status. The situational status may include predictions, where the prediction is a situational status for a particular time in the future (e.g., at a prediction time). Such predictions may be related to any type of aspect of the vehicle, including for example, the anticipated occupancy within the vehicle, the anticipated luggage utilization, the anticipated passenger influx into the vehicle (e.g., at a planned station stop), the anticipated passenger outflux from the vehicle (e.g., at a planned station stop), the anticipated noise level at locations within vehicle, the anticipated type of occupants (e.g., passengers may be observed as rowdy or noisy, traveling with pets, traveling with a group, traveling with a large amount of luggage, etc.), the anticipated smell within the vehicle (e.g., because passengers may be observed as eating food, drinking beer, or carrying a pet), the anticipated service wait time (e.g., for when the coffee cart will be moving through the train aisles or the time to wait for a seat in the on-board restaurant), etc. The cloud-based subsystem 230 may then use the situational status to determine movement control information, as discussed in more detail below.

As noted earlier, the cloud-based subsystem 230 may determine the situational status using information from the in-vehicle subsystem 210, as well as using station status information from the station stop subsystem 220, user preferences from the end-user subsystem 240, and/or reservation information the bookings subsystem 250 as discussed in more detail below. With respect to the station stop subsystem 220, it may utilize sensor data (e.g., from in-station sensors) to detect and track passengers, luggage, and/or animals that may enter, exit, or move about the station stop (e.g., along the platform of a train stop or bus stop) to determine station status information. Like the in-vehicle system 210, the station stop subsystem 220 may receive sensor data from camera sensors (e.g., by utilizing the existing security cameras or by deploying other cameras/sensors), LiDAR sensors (e.g. running an AI-based detector), Wi-Fi sensors (e.g. sensors that can count the number of Wi-Fi devices in a proximate area), RGB cameras, depth cameras, radar sensors, infrared sensors, ambient noise sensors, ambient light sensors, etc. As should be appreciated, the station stop subsystem 220 need not specifically identify individuals, and may be understood to be designed to detect, track, and predict paths of passengers, no matter the identity of the passenger. Thus, privacy of the collected information may be maintained.

Examples of the station stop status information include a quantity of boarding passengers that are located at the station stop, a precise location along the platform of the passengers waiting at the station stop, a indication that a certain number of passengers appear to be traveling as a group, a indication that a passenger may have special needs (such as elderly passengers, vision impaired passengers, passengers in a wheelchair, etc.), a movement path of boarding passengers at the station stop, just to name a few. As should be appreciated, any information about the station stop status may be determined by the station stop subsystem 220 using any available sensor data, and then this information may be used by the cloud-based subsystem 230 to determine the overall situational status and associated movement control information.

With respect to the end-user subsystem 240, it may also provide information to the cloud-based subsystem 230 that may be used to determine the overall situational status and associated movement control information. For example, the end-user subsystem 240 may determine and track individual user preferences that a passenger may have regarding transport. For example, a passenger may have a preferred departure time, a preferred arrival time, a preferred compartment type (e.g., mobile phone area, family area, quite area, food-allowed area, food-free area, pets-allowed area, pet-free area, etc.). A passenger may have a preferred occupancy density (e.g., the passenger prefers a different mode of transportation if the occupancy of the first mode of transportation will exceed 85% utilization). A passenger may have a preferred noise level (e.g., seats should be exchanged if the expected noise level will be above a certain decibel level), a preferred route (e.g., most efficient, fewest stairs, avoid curvy roads, etc.). Passenger preferences may also be understood as describing passenger's destination, traveling companions, time of travel, quantity, size, or volume of luggage, etc. The cloud-based subsystem 230 may use any of these passenger preferences to determine the overall situational status and associated movement control information.

With respect to the booking subsystem 240, it may also provide information to the cloud-based subsystem 230. For example, the booking system 240 may include information about passenger reservations (e.g., origin, destination, seat reservations, payment status, ticket information, membership in a group of travelers, group size, etc.) and transport schedules (e.g., available routes, available transport options, locations of station stops, etc.) that the cloud-based subsystem 230 may use to determine the overall situational status and associated movement control information.

As noted earlier, the movement control information may be understood as recommendation(s) for the passenger(s) or for the transport vehicle that are designed to improve the efficiency, utilization, acceptability, etc. of the transportation experience based on the situational status. For example, movement control information may include a recommended compartment or seat within the passenger transport vehicle that the passenger may want to use because, for example, the situational status indicates the compartment is expected to have low occupancy and may match the passenger's noise preferences or have sufficient space for the group of people traveling together with the passenger. The movement control information may also include a recommended boarding position at the station stop where the passenger may want to wait for the train because, for example, the situational status indicates a particular door of the train is expected to provide an unimpaired pathway to a portion of the vehicle with significant free space. For example, when there are multiple compartments in the transport vehicle, the movement control information may be used to control movement of the passenger to, from, or between the one or more compartments, based on the situation status associated with each compartment. The movement control information may also include a recommended luggage storage location within the passenger transport vehicle because, for example, the situational status indicates the location is expected to have sufficient space to accommodate the passenger's bulky suitcases. The movement control information may also include a recommended alternative mode of transportation because, for example, the situational status indicates the free capacity on the next train is expected to be very low, such that it is unlikely the passenger would be able to find a free seat. The movement control information may also include a wait time or a recommended time to visit the on-board restaurant because, for example, the situational status indicates no seats are available but are expected to free up at a later time.

The movement control information may also be related to movement recommendations for the transport vehicle. For example, it may include a recommended stop duration for the passenger transport vehicle at the station stop because, for example, the situational status indicates a large number of passengers are expected to board the train at the next stop. In a similar manner, if the situational status indicates a high level of passenger demand or predicts a lengthy exchange of passengers at a given station stop, the movement control information may also include dynamic adjustments to the passenger transport vehicle's time schedule/time table and/or track priority. For example, a train might have an originally scheduled wait time of two minutes at the next planned station stop, but a higher than normal volume of passengers is detected at the next station stop. As a result, the movement control information may extend duration of the wait time at the next planned station to five minutes, dynamically adjust the train's schedule to reflect the longer wait time, and publish/report the new schedule so that other trains might take priority of the track to enter/exit the station while the train uses the time to exchange passengers at the station stop.

The movement control information may also include a recommended stop position for the passenger transport vehicle at the station stop because, for example, the situational status indicates the position may best align the compartments with free space to the waiting locations of passengers along the platform. The movement control information may also include a recommended minimum passenger capacity of the passenger transport vehicle so that, for example, sufficient passenger space is available for the upcoming station stop, where the situational status indicates a large number of passengers are expected to board. The movement control information may also include a recommended arrival time of the passenger transport vehicle that is designed, for example, to coincide with an expected influx of passengers indicated by the situational status. The movement control information may also include a recommended departure time of the passenger transport vehicle that is designed to accommodate, for example, a senior citizen that the situational status indicates is expected to need assistance and additional time to board the train. As should be appreciated, these are just examples of the movement control information that the cloud-based subsystem 230 may determine, and it may determine any type of movement control information recommendation based on any scenario, information, preferences, and/or combination of factors indicated by the situational status.

Once the cloud-based subsystem 230 has determined the movement control information, the transport control system 200 may generate a notification message to provide the movement control information to the passenger and/or the transport vehicle. For example, the cloud-based subsystem 230 may send the movement control information to the in-vehicle subsystem 210, where it may have a display screen (or screens) where passengers in the vehicle may view the information. For example, the display screens may display the current wait time for a seat at the on-board restaurant (e.g., "10 people waiting, expected time for a seat is 20 minutes"), display a location within the train that has low occupancy (e.g., "Car 4 has 28 free seats"), or display an area of the train that is comparatively quiet (e.g., "Quiet seats available in coach no. 28, seats 100-120," suitable for families ("Other families with children are travelling in coach no. 21, compartments 2-3,"), suitable for groups, etc. Or, the cloud-based subsystem 230 may send the movement control information to the station stop subsystem 230, where it may have a display screen (or screens) on the platform or waiting area where passengers at the station stop may view the information. For example, the display screen may highlight a recommended boarding location with free seats or extra luggage space or a recommended boarding location that is suitable for groups of travelers, etc. Or, the cloud-based subsystem 230 may send the movement control information to the end-user subsystem 240, where an application running on the passenger's handheld device may display the information. For example, the application may alert the passenger as to a noisy car that the passenger may wish to avoid. Or, the cloud-based subsystem 230 may send the movement control information to the booking subsystem 250, where the reservation or booking application may use and/or display the information. For example, the reservation system may display as occupied, seats that were recently taken by boarding passengers.

Figure 3:
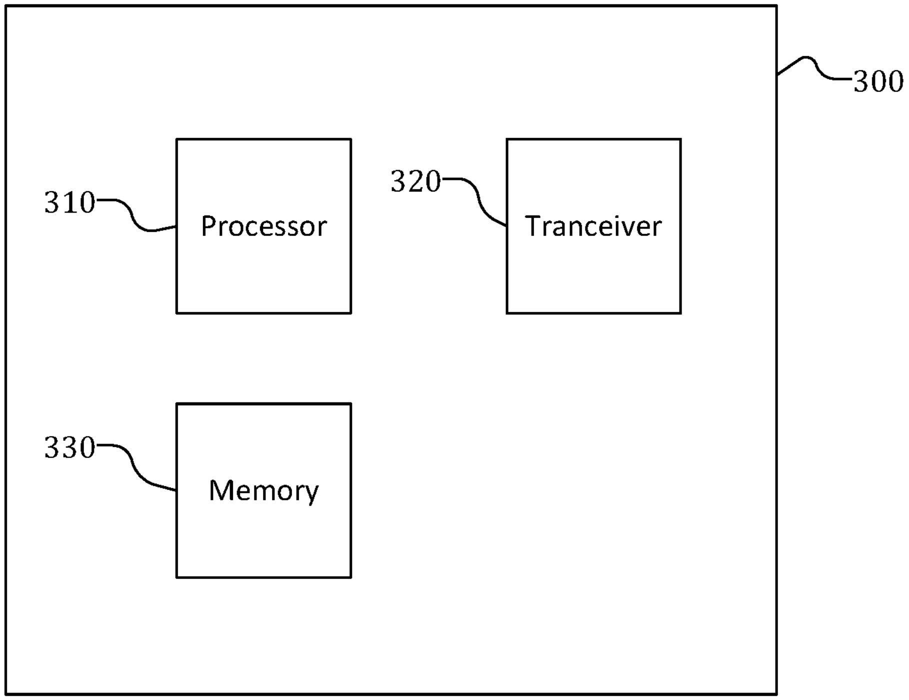
FIG. 3 illustrates an exemplary schematic drawing of a transport control system for improving the utilization of a public transport vehicle.

FIG. 3 is a schematic drawing illustrating a device 300 that may be used to monitor and improve utilization of a public transport vehicle. The device 300 may include any of the features discussed above with respect to a transport control system (e.g., transport control system 200) and any of FIGS. 1-2. FIG. 3 may be implemented as a device, a system, a method, and/or a computer readable medium that, when executed, performs the features of the transport control system described above. It should be understood that device 300 is only an example, and other configurations may be possible that include, for example, different components or additional components.

Device 300 includes a processor 310. In addition to or in combination with any of the features described in this or the following paragraphs, processor 310 is configured to determine an in-vehicle status of a passenger transport vehicle based on in-vehicle sensor data about an interior of the passenger transport vehicle. In addition to or in combination with any of the features described in this or the following paragraphs, processor 310 is also configured to determine a station status at a station stop for the passenger transport vehicle based on station sensor data about the station stop. In addition to or in combination with any of the features described in this or the following paragraphs, processor 310 is also configured to determine a situational status based on the in-vehicle status and the station status. In addition to or in combination with any of the features described in this or the following paragraphs, processor 310 is also configured to generate a notification message with movement control information for the passenger transport vehicle or for a passenger, wherein the movement control information is based on the situational status.

Furthermore, in addition to or in combination with any one of the features of this and/or the preceding paragraph with respect to device 300, the passenger transport vehicle may include at least one of a bus, a train, an autonomous vehicle, a robot, an aircraft, and an automobile for transporting multiple passengers. Furthermore, in addition to or in combination with any one of the features of this and/or the preceding paragraph, processor 310 may be further configured to receive the in-vehicle sensor data (e.g., from an in-vehicle sensor configured to collect data about the interior of the passenger transport vehicle). Furthermore, in addition to or in combination with any one of the features of this and/or the preceding paragraph, the in-vehicle sensor may include at least one of a camera, a red-green-blue camera, a depth camera, a seat occupancy sensor, a light detection and ranging sensor, a radar sensor, an infrared sensor, a ambient noise sensor, and an ambient light sensor. Furthermore, in addition to or in combination with any one of the features of this and/or the preceding paragraph, processor 310 may be further configured to receive the station sensor data (e.g., from a station sensor configured to collect data about the station stop). Furthermore, in addition to or in combination with any one of the features of this and/or the preceding paragraph with respect to device 300, the station sensor may include at least one of a camera, a red-green-blue camera, a depth camera, a seat occupancy sensor, a light detection and ranging sensor, a radar sensor, an infrared sensor, a ambient noise sensor, and an ambient light sensor.

Furthermore, in addition to or in combination with any one of the features of this and/or the preceding two paragraphs with respect to device 300, the situational status may be associated with a prediction time, wherein the situational status includes at least one of an anticipated occupancy within the passenger transport vehicle at the prediction time, an anticipated luggage utilization within the transport vehicle at the prediction time, an anticipated passenger influx into the passenger transport vehicle at the future time, an anticipated passenger outflux from the passenger transport vehicle at the station stop at the future time, an anticipated noise level within the passenger transport vehicle at the prediction time, an anticipated type of occupant within the passenger transport vehicle at the prediction time, an anticipated smell within the passenger transport vehicle at the prediction time, and an anticipated service wait time with respect to the prediction time. Furthermore, in addition to or in combination with any one of the features of this and/or the preceding two paragraphs, processor 310 may be further configured to determine in real-time the in-vehicle status, the station status, and/or the situational status.

Furthermore, in addition to or in combination with any one of the features of this and/or the preceding three paragraphs, processor 310 may be further configured to generate in real-time the notification message with the movement control information. Furthermore, in addition to or in combination with any one of the features of this and/or the preceding three paragraphs with respect to device 300, the in-vehicle status may include at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated the passengers, and a quantity of wireless radios within the passenger transport vehicle. Furthermore, in addition to or in combination with any one of the features of this and/or the preceding three paragraphs, processor 310 may be further configured to determine that the passenger belongs to a group of passengers, wherein the movement control information includes recommendations based on accommodating the group of passengers.

Furthermore, in addition to or in combination with any one of the features of this and/or the preceding four paragraphs with respect to device 300, the station status may include at least one of a quantity of boarding passengers at the station stop, a location of boarding passengers waiting at the station stop, an special needs indication of at least one of the boarding passengers, and a movement path of boarding passengers at the station stop. Furthermore, in addition to or in combination with any one of the features of this and/or the preceding four paragraphs with respect to device 300, the passenger transport vehicle may include one or more compartments, wherein the in-vehicle status may include a compartment status associated with a corresponding one of the pone or more compartments, and/or wherein the movement control information may control movement of the passenger to, from, or between the one or more compartments. Furthermore, in addition to or in combination with any one of the features of this and/or the preceding four paragraphs, processor 310 may be part of or communicates with a cloud-based or edge-based server.

Furthermore, in addition to or in combination with any one of the features of this and/or the preceding five paragraphs, processor 310 may be further configured to receive a passenger preference for utilizing the passenger transport vehicle, wherein the movement control information is further based on the passenger preference. Furthermore, in addition to or in combination with any one of the features of this and/or the preceding five paragraphs with respect to device 300, the passenger preference may include at least one of a preferred departure time, a preferred arrival time, a preferred compartment type (e.g., mobile phone area, family area, quite area, food-allowed area, food-free area, pets-allowed area, pet-free area, etc.) within the passenger transport vehicle, a preferred occupancy density in the passenger transport vehicle, a preferred noise level in the passenger transport vehicle, a preferred route of the passenger transport vehicle, a destination, and a quantity, size or volume of luggage. Furthermore, in addition to or in combination with any one of the features of this and/or the preceding five paragraphs with respect to device 300, the movement control information may include at least one of a recommended boarding position at the station stop, a recommended compartment within the passenger transport vehicle, a recommended seat within the passenger transport vehicle, a recommended luggage storage location within the passenger transport vehicle, a recommended stop duration for the passenger transport vehicle at the station stop, a recommended stop position for the passenger transport vehicle at the station stop, a recommended minimum passenger capacity of the passenger transport vehicle, a recommended arrival time of the passenger transport vehicle, a recommended departure time of the passenger transport vehicle, a recommended alternative mode of transportation, and a recommended special service to provide to the passenger.

Furthermore, in addition to or in combination with any one of the features of this and/or the preceding six paragraphs with respect to device 300, the recommended special service may include a dispatch of wheelchair assistance for the passenger or a dispatch of a personal assistant for helping the passenger. Furthermore, in addition to or in combination with any one of the features of this and/or the preceding six paragraphs, processor 310 may be further configured to receive reservation information associated with the passenger transport vehicle, wherein the situational status is further based on the reservation information. Furthermore, in addition to or in combination with any one of the features of this and/or the preceding six paragraphs, device 300 may further include a receiver (e.g., transceiver 320) to receive the station sensor data. Furthermore, in addition to or in combination with any one of the features of this and/or the preceding six paragraphs, device 300 may further include a memory 330 configured to store at least one of the in-vehicle status, the in-vehicle sensor data, the station status, the station sensor data, the situational status, the notification message, and the movement control information. Furthermore, in addition to or in combination with any one of the features of this and/or the preceding six paragraphs, device 300 may further include a transmitter (e.g., transceiver 320) configured to transmit the notification to a hand-held device or a visual display.

Figure 4:
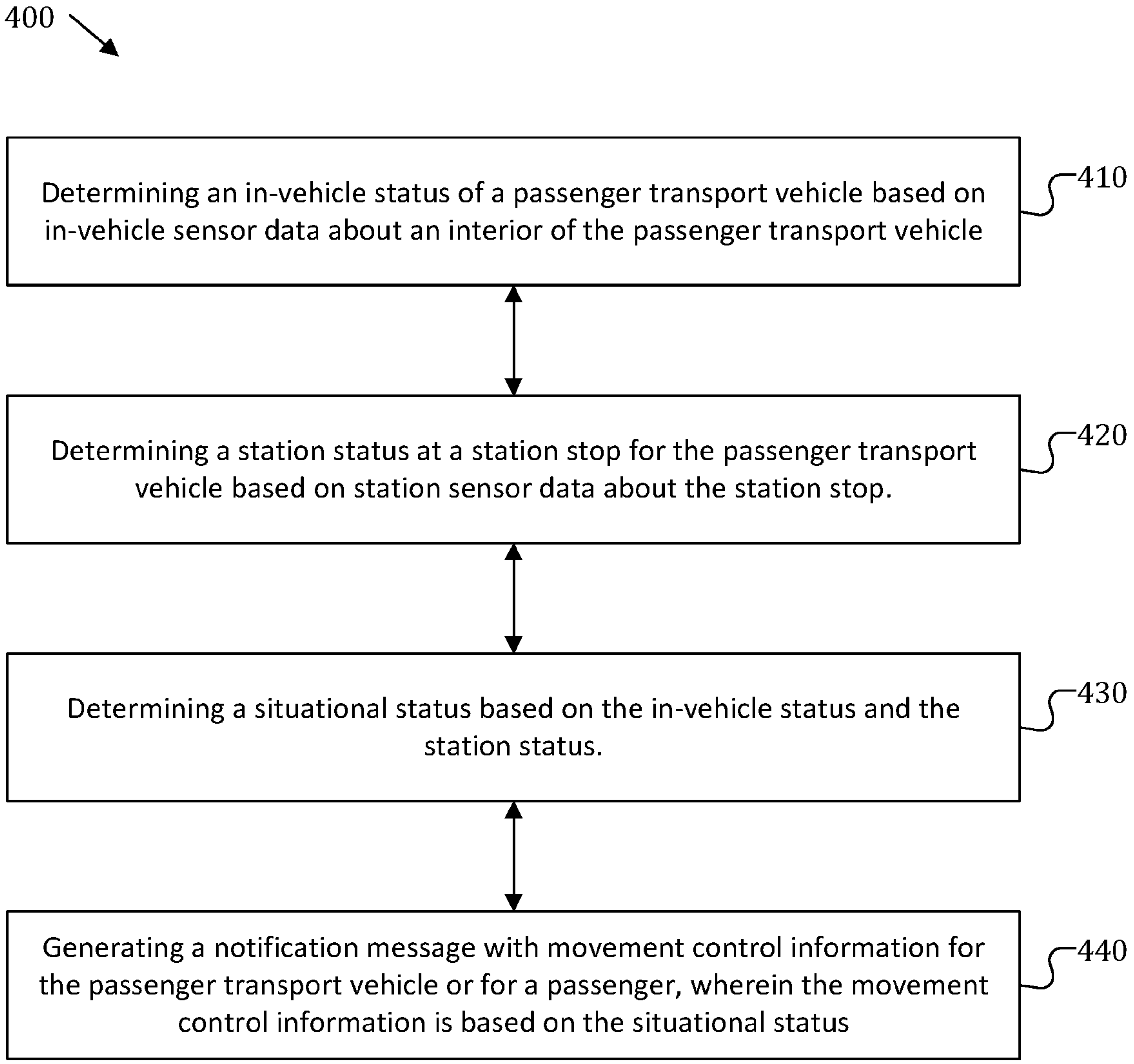
FIG. 4 depicts an exemplary schematic flow diagram of a transport control system for improving the utilization of a public transport vehicle.

FIG. 4 depicts a schematic flow diagram of a method 400 for monitoring and improving utilization of a public transport vehicle. Method 400 may implement any of the features discussed above with respect to a transport control system (e.g., transport control system 200) and any of FIGS. 1-3.

Method 400 includes, in 410, determining an in-vehicle status of a passenger transport vehicle based on in-vehicle sensor data about an interior of the passenger transport vehicle. The method 400 also includes, in 420, determining a station status at a station stop for the passenger transport vehicle based on station sensor data about the station stop. The method 400 also includes, in 430, determining a situational status based on the in-vehicle status and the station status. The method 400 also includes, in 440, generating a notification message with movement control information for the passenger transport vehicle or for a passenger, wherein the movement control information is based on the situational status.

In the following, various examples are provided that may include one or more aspects described above with respect to a transport control system (e.g., transport control system 200, device 300, method 400) and any of FIGS. 1-4. The examples provided in relation to the devices may apply also to the described method(s), and vice versa.

Example 1 is a device including a processor configured to determine an in-vehicle status of a passenger transport vehicle based on in-vehicle sensor data about an interior of the passenger transport vehicle. The processor is also configured to determine a station status at a station stop for the passenger transport vehicle based on station sensor data about the station stop. The processor is also configured to determine a situational status based on the in-vehicle status and the station status. The processor is also configured to generate a notification message with movement control information for the passenger transport vehicle or for a passenger, wherein the movement control information is based on the situational status.

Example 2 is the device of example 1, wherein the passenger transport vehicle includes at least one of a bus, a train, an autonomous vehicle, a robot, an aircraft, and an automobile for transporting multiple passengers.

Example 3 is the device of example 1 or 2, wherein the processor is further configured to receive the in-vehicle sensor data (e.g., from an in-vehicle sensor configured to collect data about the interior of the passenger transport vehicle).

Example 4 is the device of any one of examples 1 to 3, wherein the in-vehicle sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 5 is the device of any one of examples 1 to 4, wherein the processor is further configured to receive the in-station sensor data (e.g., from a station sensor configured to collect data about the station stop).

Example 6 is the device of any one of examples 1 to 5, wherein the station sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 7 is the device of any one of examples 1 to 6, wherein the situational status is associated with a prediction time, wherein the situational status includes at least one of an anticipated occupancy within the passenger transport vehicle at the prediction time, an anticipated luggage utilization within the transport vehicle at the prediction time, an anticipated passenger influx into the passenger transport vehicle at the future time, an anticipated passenger outflux from the passenger transport vehicle at the station stop at the future time, an anticipated noise level within the passenger transport vehicle at the prediction time, an anticipated type of occupant within the passenger transport vehicle at the prediction time, an anticipated smell within the passenger transport vehicle at the prediction time, and an anticipated service wait time with respect to the prediction time.

Example 8 is the device of any one of examples 1 to 7, wherein the processor is configured to determine in real-time the in-vehicle status, the station status, and/or the situational status.

Example 9 is the device of any one of examples 1 to 8, wherein the processor is configured to generate in real-time the notification message with the movement control information.

Example 10 is the device of any one of examples 1 to 9, wherein the in-vehicle status includes at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated the passengers, and a quantity of wireless radios within the passenger transport vehicle.

Example 11 is the device of any one of examples 1 to 10, wherein the processor is further configured to determine that the passenger belongs to a group of passengers, wherein the movement control information includes recommendations based on accommodating the group of passengers.

Example 12 is the device of any one of examples 1 to 11, wherein the station status includes at least one of a quantity of boarding passengers at the station stop, a location of boarding passengers waiting at the station stop, an special needs indication of at least one of the boarding passengers, and a movement path of boarding passengers at the station stop.

Example 13 is the device of any one of examples 1 to 12, wherein the passenger transport vehicle includes one or more compartments, wherein the in-vehicle status includes a compartment status associated with a corresponding one of the pone or more compartments, and/or wherein the movement control information controls movement of the passenger to, from, or between the one or more compartments.

Example 14 is the device of any one of examples 1 to 13, wherein the processor is part of or communicates with a cloud-based or edge-based server.

Example 15 is the device of any one of examples 1 to 14, wherein the processor is further configured to receive a passenger preference for utilizing the passenger transport vehicle, wherein the movement control information is further based on the passenger preference.

Example 16 is the device of example 15, wherein the passenger preference includes at least one of a preferred departure time, a preferred arrival time, a preferred compartment type (e.g., mobile phone area, family area, quite area, food-allowed area, food-free area, pets-allowed area, pet-free area, etc.) within the passenger transport vehicle, a preferred occupancy density in the passenger transport vehicle, a preferred noise level in the passenger transport vehicle, a preferred route of the passenger transport vehicle, a destination, and a quantity, size or volume of luggage.

Example 17 is the device of any one of examples 1 to 16, wherein movement control information includes at least one of a recommended boarding position at the station stop, a recommended compartment within the passenger transport vehicle, a recommended seat within the passenger transport vehicle, a recommended luggage storage location within the passenger transport vehicle, a recommended stop duration for the passenger transport vehicle at the station stop, a recommended stop position for the passenger transport vehicle at the station stop, a recommended minimum passenger capacity of the passenger transport vehicle, a recommended arrival time of the passenger transport vehicle, a recommended departure time of the passenger transport vehicle, a recommended alternative mode of transportation, and a recommended special service to provide to the passenger.

Example 18 is the device of example 17, wherein the recommended special service includes a dispatch of wheelchair assistance for the passenger or a dispatch of a personal assistant for helping the passenger.

Example 19 is the device of any one of examples 1 to 18, wherein the processor is further configured to receive reservation information associated with the passenger transport vehicle, wherein the situational status is further based on the reservation information.

Example 20 is the device of any one of examples 1 to 19, the device further including a receiver (or transceiver) to receive the station sensor data and/or the in-vehicle sensor data.

Example 21 is the device of any one of examples 1 to 20, the device further including a memory configured to store at least one of the in-vehicle status, the in-vehicle sensor data, the station status, the station sensor data, the situational status, the notification message, and the movement control information.

Example 22 is the device of any one of examples 1 to 21, the device further including a transmitter (or transceiver) configured to transmit the notification to a hand-held device or a visual display.

Example 23 is a non-transitory computer readable medium including instructions which, if executed, cause one or more processors to determine an in-vehicle status of a passenger transport vehicle based on in-vehicle sensor data about an interior of the passenger transport vehicle. The instructions are also configured to cause the one or more processors to determine a station status at a station stop for the passenger transport vehicle based on station sensor data about the station stop. The instructions are also configured to cause the one or more processors to determine a situational status based on the in-vehicle status and the station status. The instructions are also configured to cause the one or more processors to generate a notification message with movement control information for the passenger transport vehicle or for a passenger, wherein the movement control information is based on the situational status.

Example 24 is the non-transitory computer readable medium of example 23, wherein the passenger transport vehicle includes at least one of a bus, a train, an autonomous vehicle, a robot, an aircraft, and an automobile for transporting multiple passengers.

Example 25 is the non-transitory computer readable medium of example 23 or 24, wherein the instructions are further configured to cause the one or more processors to receive the in-vehicle sensor data (e.g., from an in-vehicle sensor configured to collect data about the interior of the passenger transport vehicle).

Example 26 is the non-transitory computer readable medium of any one of examples 23 to 25, wherein the in-vehicle sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 27 is the non-transitory computer readable medium of any one of examples 23 to 26, wherein the instructions are further configured to cause the one or more processors to receive the station data (e.g. from a station sensor configured to collect data about the station stop).

Example 28 is the non-transitory computer readable medium of any one of examples 23 to 27, wherein the station sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 29 is the non-transitory computer readable medium of any one of examples 23 to 28, wherein the situational status is associated with a prediction time, wherein the situational status includes at least one of an anticipated occupancy within the passenger transport vehicle at the prediction time, an anticipated luggage utilization within the transport vehicle at the prediction time, an anticipated passenger influx into the passenger transport vehicle at the future time, an anticipated passenger outflux from the passenger transport vehicle at the station stop at the future time, an anticipated noise level within the passenger transport vehicle at the prediction time, an anticipated type of occupant within the passenger transport vehicle at the prediction time, an anticipated smell within the passenger transport vehicle at the prediction time, and an anticipated service wait time with respect to the prediction time.

Example 30 is the non-transitory computer readable medium of any one of examples 23 to 29, wherein the instructions are further configured to cause the one or more processors to determine in real-time the in-vehicle status, the station status, and/or the situational status.

Example 31 is the non-transitory computer readable medium of any one of examples 23 to 30, wherein the instructions are further configured to cause the one or more processors to generate in real-time the notification message with the movement control information.

Example 32 is the non-transitory computer readable medium of any one of examples 23 to 31, wherein the in-vehicle status includes at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated the passengers, and a quantity of wireless radios within the passenger transport vehicle.

Example 33 is the non-transitory computer readable medium of any one of examples 23 to 32, wherein the instructions are further configured to cause the one or more processors to determine that the passenger belongs to a group of passengers, wherein the movement control information includes recommendations based on accommodating the group of passengers.

Example 34 is the non-transitory computer readable medium of any one of examples 23 to 33, wherein the station status includes at least one of a quantity of boarding passengers at the station stop, a location of boarding passengers waiting at the station stop, an special needs indication of at least one of the boarding passengers, and a movement path of boarding passengers at the station stop.

Example 35 is the non-transitory computer readable medium of any one of examples 23 to 34, wherein the passenger transport vehicle includes one or more compartments, wherein the in-vehicle status includes a compartment status associated with a corresponding one of the pone or more compartments, and/or wherein the movement control information controls movement of the passenger to, from, or between the one or more compartments.

Example 36 is the non-transitory computer readable medium of any one of examples 23 to 35, wherein the one or more processors are part of or communicates with a cloud-based or edge-based server.

Example 37 is the non-transitory computer readable medium of any one of examples 23 to 36, wherein the instructions are further configured to cause the one or more processors to receive a passenger preference for utilizing the passenger transport vehicle, wherein the movement control information is further based on the passenger preference.

Example 38 is the non-transitory computer readable medium of example 37, wherein the passenger preference includes at least one of a preferred departure time, a preferred arrival time, a preferred compartment type (e.g., mobile phone area, family area, quite area, food-allowed area, food-free area, pets-allowed area, pet-free area, etc.) within the passenger transport vehicle, a preferred occupancy density in the passenger transport vehicle, a preferred noise level in the passenger transport vehicle, a preferred route of the passenger transport vehicle, a destination, and a quantity, size or volume of luggage.

Example 39 is the non-transitory computer readable medium of any one of examples 23 to 38, wherein movement control information includes at least one of a recommended boarding position at the station stop, a recommended compartment within the passenger transport vehicle, a recommended seat within the passenger transport vehicle, a recommended luggage storage location within the passenger transport vehicle, a recommended stop duration for the passenger transport vehicle at the station stop, a recommended stop position for the passenger transport vehicle at the station stop, a recommended minimum passenger capacity of the passenger transport vehicle, a recommended arrival time of the passenger transport vehicle, a recommended departure time of the passenger transport vehicle, a recommended alternative mode of transportation, and a recommended special service to provide to the passenger.

Example 40 is the non-transitory computer readable medium of example 39, wherein the recommended special service includes a dispatch of wheelchair assistance for the passenger or a dispatch of a personal assistant for helping the passenger.

Example 41 is the non-transitory computer readable medium of any one of examples 23 to 40, wherein the instructions are further configured to cause the one or more processors to receive reservation information associated with the passenger transport vehicle, wherein the situational status is further based on the reservation information.

Example 42 is the non-transitory computer readable medium of any one of examples 23 to 41, wherein the instructions are further configured to cause the one or more processors to receive (e.g., via a receiver or transceiver) the station sensor data and/or the in-vehicle sensor data.

Example 43 is the non-transitory computer readable medium of any one of examples 23 to 42, wherein the instructions are further configured to cause the one or more processors to store (e.g., via a memory) at least one of the in-vehicle status, the in-vehicle sensor data, the station status, the station sensor data, the situational status, the notification message, and the movement control information.

Example 44 is the non-transitory computer readable medium of any one of examples 23 to 43, wherein the instructions are further configured to cause the one or more processors to transmit (e.g., via a transmitter or transceiver) the notification to a hand-held non-transitory computer readable medium or a visual display.

Example 45 is a method including determining an in-vehicle status of a passenger transport vehicle based on in-vehicle sensor data about an interior of the passenger transport vehicle. The method also includes determining a station status at a station stop for the passenger transport vehicle based on station sensor data about the station stop. The method also includes determining a situational status based on the in-vehicle status and the station status. The method also includes generating a notification message with movement control information for the passenger transport vehicle or for a passenger, wherein the movement control information is based on the situational status.

Example 46 is the method of example 45, wherein the passenger transport vehicle includes at least one of a bus, a train, an autonomous vehicle, a robot, an aircraft, and an automobile for transporting multiple passengers.

Example 47 is the method of example 45 or 46, wherein the method further includes receiving (e.g., via a receiver or transceiver) the in-vehicle sensor data (e.g., from an in-vehicle sensor configured to collect data about the interior of the passenger transport vehicle).

Example 48 is the method of any one of examples 45 to 47, wherein the in-vehicle sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 49 is the method of any one of examples 45 to 48, wherein the method further includes receiving (e.g., via a receiver or transceiver) the in-station sensor data (e.g., from a station sensor configured to collect data about the station stop).

Example 50 is the method of any one of examples 45 to 49, wherein the station sensor includes at least one of a camera, a red-green-blue camera, a depth camera, a seat occupancy sensor, a light detection and ranging sensor, a radar sensor, an infrared sensor, a ambient noise sensor, and an ambient light sensor.

Example 51 is the method of any one of examples 45 to 50, wherein the situational status is associated with a prediction time, wherein the situational status includes at least one of an anticipated occupancy within the passenger transport vehicle at the prediction time, an anticipated luggage utilization within the transport vehicle at the prediction time, an anticipated passenger influx into the passenger transport vehicle at the future time, an anticipated passenger outflux from the passenger transport vehicle at the station stop at the future time, an anticipated noise level within the passenger transport vehicle at the prediction time, an anticipated type of occupant within the passenger transport vehicle at the prediction time, an anticipated smell within the passenger transport vehicle at the prediction time, and an anticipated service wait time with respect to the prediction time.

Example 52 is the method of any one of examples 45 to 51, wherein the method further includes determining in real-time the in-vehicle status, the station status, and/or the situational status.

Example 53 is the method of any one of examples 45 to 52, wherein the method further includes generating in real-time the notification message with the movement control information.

Example 54 is the method of any one of examples 45 to 53, wherein the in-vehicle status includes at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated the passengers, and a quantity of wireless radios within the passenger transport vehicle.

Example 55 is the method of any one of examples 45 to 54, wherein the method further includes determining that the passenger belongs to a group of passengers, wherein the movement control information includes recommendations based on accommodating the group of passengers.

Example 56 is the method of any one of examples 45 to 55, wherein the station status includes at least one of a quantity of boarding passengers at the station stop, a location of boarding passengers waiting at the station stop, an special needs indication of at least one of the boarding passengers, and a movement path of boarding passengers at the station stop.

Example 57 is the method of any one of examples 45 to 56, wherein the passenger transport vehicle includes one or more compartments, wherein the in-vehicle status includes a compartment status associated with a corresponding one of the pone or more compartments, and/or wherein the movement control information controls movement of the passenger to, from, or between the one or more compartments.

Example 58 is the method of any one of examples 45 to 57, wherein the method further includes receiving a passenger preference for utilizing the passenger transport vehicle, wherein the movement control information is further based on the passenger preference.

Example 59 is the method of example 58, wherein the passenger preference includes at least one of a preferred departure time, a preferred arrival time, a preferred compartment type (e.g., mobile phone area, family area, quite area, food-allowed area, food-free area, pets-allowed area, pet-free area, etc.) within the passenger transport vehicle, a preferred occupancy density in the passenger transport vehicle, a preferred noise level in the passenger transport vehicle, a preferred route of the passenger transport vehicle, a destination, and a quantity, size or volume of luggage.

Example 60 is the method of any one of examples 45 to 59, wherein movement control information includes at least one of a recommended boarding position at the station stop, a recommended compartment within the passenger transport vehicle, a recommended seat within the passenger transport vehicle, a recommended luggage storage location within the passenger transport vehicle, a recommended stop duration for the passenger transport vehicle at the station stop, a recommended stop position for the passenger transport vehicle at the station stop, a recommended minimum passenger capacity of the passenger transport vehicle, a recommended arrival time of the passenger transport vehicle, a recommended departure time of the passenger transport vehicle, a recommended alternative mode of transportation, and a recommended special service to provide to the passenger.

Example 61 is the method of example 60, wherein the recommended special service includes a dispatch of wheelchair assistance for the passenger or a dispatch of a personal assistant for helping the passenger.

Example 62 is the method of any one of examples 45 to 61, wherein the method further includes receiving reservation information associated with the passenger transport vehicle, wherein the situational status is further based on the reservation information.

Example 63 is the method of any one of examples 45 to 62, where the method further includes receiving (e.g. via a receiver or transceiver) the station sensor data (e.g., from a station sensor) and/or the in-vehicle sensor data (e.g., from an in-vehicle sensor).

Example 64 is the method of any one of examples 45 to 63, the method further including storing (e.g., via a memory) at least one of the in-vehicle status, the in-vehicle sensor data, the station status, the station sensor data, the situational status, the notification message, and the movement control information.

Example 65 is the method of any one of examples 45 to 64, the method further including transmitting (e.g., via a receiver or transceiver) the notification to a hand-held method or a visual display.

Example 66 is an apparatus including a means for determining an in-vehicle status of a passenger transport vehicle based on in-vehicle sensor data about an interior of the passenger transport vehicle. The apparatus also includes a means for determining a station status at a station stop for the passenger transport vehicle based on station sensor data about the station stop. The apparatus also includes a means for determining a situational status based on the in-vehicle status and the station status. The apparatus also includes a means for generating a notification message with movement control information for the passenger transport vehicle or for a passenger, wherein the movement control information is based on the situational status.

Example 67 is the apparatus of example 66, wherein the passenger transport vehicle includes at least one of a bus, a train, an autonomous vehicle, a robot, an aircraft, and an automobile for transporting multiple passengers.

Example 68 is the apparatus of example 66 or 67, wherein the apparatus further includes a means for receiving (e.g., a receiver or transceiver) the in-vehicle sensor data from an in-vehicle sensing means configured to collect data about the interior of the passenger transport vehicle.

Example 69 is the apparatus of any one of examples 66 to 68, wherein the in-vehicle sensing means includes at least one of a camera, a red-green-blue camera, a depth camera, a seat occupancy sensor, a light detection and ranging sensor, a radar sensor, an infrared sensor, a ambient noise sensor, and an ambient light sensor.

Example 70 is the apparatus of any one of examples 66 to 69, wherein the apparatus further includes a means for receiving (e.g., a receiver or transceiver) the in-station sensor data from a station sensing means configured to collect data about the station stop.

Example 71 is the apparatus of any one of examples 66 to 70, wherein the station sensing means includes at least one of a camera, a red-green-blue camera, a depth camera, a seat occupancy sensor, a light detection and ranging sensor, a radar sensor, an infrared sensor, a ambient noise sensor, and an ambient light sensor.

Example 72 is the apparatus of any one of examples 66 to 71, wherein the situational status is associated with a prediction time, wherein the situational status includes at least one of an anticipated occupancy within the passenger transport vehicle at the prediction time, an anticipated luggage utilization within the transport vehicle at the prediction time, an anticipated passenger influx into the passenger transport vehicle at the future time, an anticipated passenger outflux from the passenger transport vehicle at the station stop at the future time, an anticipated noise level within the passenger transport vehicle at the prediction time, an anticipated type of occupant within the passenger transport vehicle at the prediction time, an anticipated smell within the passenger transport vehicle at the prediction time, and an anticipated service wait time with respect to the prediction time.

Example 73 is the apparatus of any one of examples 66 to 72, wherein the apparatus further includes a means for determining in real-time the in-vehicle status, the station status, and/or the situational status.

Example 74 is the apparatus of any one of examples 66 to 73, wherein the apparatus further includes a means for generating in real-time the notification message with the movement control information.

Example 75 is the apparatus of any one of examples 66 to 74, wherein the in-vehicle status includes at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated the passengers, and a quantity of wireless radios within the passenger transport vehicle.

Example 76 is the apparatus of any one of examples 66 to 75, wherein the apparatus further includes a means for determining that the passenger belongs to a group of passengers, wherein the movement control information includes recommendations based on accommodating the group of passengers.

Example 77 is the apparatus of any one of examples 66 to 76, wherein the station status includes at least one of a quantity of boarding passengers at the station stop, a location of boarding passengers waiting at the station stop, an special needs indication of at least one of the boarding passengers, and a movement path of boarding passengers at the station stop.

Example 78 is the apparatus of any one of examples 66 to 77, wherein the passenger transport vehicle includes one or more compartments, wherein the in-vehicle status includes a compartment status associated with a corresponding one of the pone or more compartments, and/or wherein the movement control information controls movement of the passenger to, from, or between the one or more compartments.

Example 79 is the apparatus of any one of examples 66 to 78, wherein the apparatus further includes a means for receiving (e.g. a receiver or transceiver) a passenger preference for utilizing the passenger transport vehicle, wherein the movement control information is further based on the passenger preference.

Example 80 is the apparatus of example 79, wherein the passenger preference includes at least one of a preferred departure time, a preferred arrival time, a preferred compartment type (e.g., mobile phone area, family area, quite area, food-allowed area, food-free area, pets-allowed area, pet-free area, etc.) within the passenger transport vehicle, a preferred occupancy density in the passenger transport vehicle, a preferred noise level in the passenger transport vehicle, a preferred route of the passenger transport vehicle, a destination, and a quantity, size or volume of luggage.

Example 81 is the apparatus of any one of examples 66 to 80, wherein movement control information includes at least one of a recommended boarding position at the station stop, a recommended compartment within the passenger transport vehicle, a recommended seat within the passenger transport vehicle, a recommended luggage storage location within the passenger transport vehicle, a recommended stop duration for the passenger transport vehicle at the station stop, a recommended stop position for the passenger transport vehicle at the station stop, a recommended minimum passenger capacity of the passenger transport vehicle, a recommended arrival time of the passenger transport vehicle, a recommended departure time of the passenger transport vehicle, a recommended alternative mode of transportation, and a recommended special service to provide to the passenger.

Example 82 is the apparatus of example 81, wherein the recommended special service includes a dispatch of wheelchair assistance for the passenger or a dispatch of a personal assistant for helping the passenger.

Example 83 is the apparatus of any one of examples 66 to 82, wherein the apparatus further includes a means for receiving (e.g. a receiver or transceiver) reservation information associated with the passenger transport vehicle, wherein the situational status is further based on the reservation information.

Example 84 is the apparatus of any one of examples 66 to 83, wherein the apparatus further includes a means for receiving (e.g. a receiver or transceiver) the station sensor data and/or the in-vehicle sensor data.

Example 85 is the apparatus of any one of examples 66 to 84, wherein the apparatus further includes a means for storing (e.g., a memory) at least one of the in-vehicle status, the in-vehicle sensor data, the station status, the station sensor data, the situational status, the notification message, and the movement control information.

Example 86 is the apparatus of any one of examples 66 to 85, the apparatus further including a means for transmitting (e.g., a receiver or transceiver) the notification to a handheld apparatus or a visual display.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:

determine an in-vehicle status of a passenger transport vehicle based on in-vehicle sensor data about an interior of the passenger transport vehicle, wherein the passenger transport vehicle comprises one or more compartments;

determine a station status at a planned station stop along a route for the passenger transport vehicle based on station sensor data about the planned station stop;

determine a situational status based on the in-vehicle status and the station status; and generate, based on the situational status, movement control information for the passenger transport vehicle, wherein the movement control information comprises:

an extension of a planned wait time duration for the passenger transport vehicle at the planned station stop; and dynamically publish a revised schedule of the passenger transport vehicle based on the extension of the planned wait time duration, wherein the revised schedule is published to a second vehicle so that it may change its priority along the route based on the revised schedule.

2. The device of claim 1, wherein the passenger transport vehicle comprises at least one of a bus, a train, an autonomous vehicle, a robot, an aircraft, and an automobile for transporting multiple passengers.

3. The device of claim 1, wherein the processor is further configured to receive the in-vehicle sensor data from an in-vehicle sensor configured to collect data about the interior of the passenger transport vehicle or to receive the station sensor data from a station sensor configured to collect data about the planned station stop.

4. The device of claim 3, wherein the in-vehicle sensor comprises at least one of a camera, a red-green-blue camera, a depth camera, a seat occupancy sensor, a light detection and ranging sensor, a radar sensor, an infrared sensor, an ambient noise sensor, and an ambient light sensor.

5. The device of claim 1, wherein the situational status is associated with a prediction time, wherein the situational status comprises at least one of an anticipated occupancy within the passenger transport vehicle at the prediction time, an anticipated luggage utilization within the passenger transport vehicle at the prediction time, an anticipated passenger influx into the passenger transport vehicle at the prediction time, an anticipated passenger outflux from the passenger transport vehicle at the planned station stop at the prediction time, an anticipated noise level within the passenger transport vehicle at the prediction time, an anticipated type of occupant within the passenger transport vehicle at the prediction time, an anticipated smell within the passenger transport vehicle at the prediction time, or an anticipated service wait time with respect to the prediction time.

6. The device of claim 1, wherein the processor is configured to determine in real-time at least one of the in-vehicle status, the station status, and the situational status.

7. The device of claim 1, wherein the in-vehicle status comprises at least one of a location of passengers within the passenger transport vehicle, a location of free space within the passenger transport vehicle, a movement path of passengers within the passenger transport vehicle, a maximum occupancy of the passenger transport vehicle, a noise level within the passenger transport vehicle, a utilization level of the passenger transport vehicle, a luggage compartment status of the passenger transport vehicle, a type of food/beverage associated with a passenger, or a quantity of wireless radios within the passenger transport vehicle.

8. The device of claim 1, wherein the processor is further configured to determine that a passenger belongs to a group of passengers, wherein the movement control information comprises recommendations based on accommodating the group of passengers.

9. The device claim 1, wherein the station status comprises at least one of a quantity of boarding passengers at the planned station stop, a location of boarding passengers waiting at the planned station stop, a special needs indication of at least one of the quantity of boarding passengers, or a movement path of boarding passengers at the planned station stop.

10. The device of claim 1, wherein the in-vehicle status comprises a compartment status associated with a corresponding one of the one or more compartments.

11. The device of claim 1, wherein the processor is part of a cloud-based or edge-based server or communicates with the cloud-based or edge-based server.

12. A non-transitory computer readable medium comprising instructions which, if executed, cause one or more processors to:

determine an in-vehicle status of a passenger transport vehicle based on in-vehicle sensor data about an interior of the passenger transport vehicle, wherein the passenger transport vehicle comprises one or more compartments;

determine a station status at a planned station stop along a route for the passenger transport vehicle based on station sensor data about the planned station stop;

determine a situational status based on the in-vehicle status and the station status; and generate, based on the situational status, movement control information for the passenger transport vehicle, wherein the movement control information comprises:

an extension of a planned wait time duration for the passenger transport vehicle at the planned station stop; and dynamically publish a revised schedule of the passenger transport vehicle based on the extension of the planned wait time duration, wherein the revised schedule is published to a second vehicle so that it may change its priority along the route based on the revised schedule.

13. The non-transitory computer readable medium of claim 12, wherein the instructions are further configured to cause the one or more processors to receive a passenger preference for utilizing the passenger transport vehicle, wherein the movement control information is further based on the passenger preference.

14. The non-transitory computer readable medium of claim 13, wherein the passenger preference comprises at least one of a preferred departure time, a preferred arrival time, a preferred compartment type within the passenger transport vehicle, a preferred occupancy density in the passenger transport vehicle, a preferred noise level in the passenger transport vehicle, a preferred route of the passenger transport vehicle, a destination, or a quantity, size or volume of luggage.

15. The non-transitory computer readable medium of claim 12, wherein movement control information comprises at least one of a recommended boarding position at the planned station stop, a recommended compartment within the passenger transport vehicle, a recommended seat within the passenger transport vehicle, a recommended luggage storage location within the passenger transport vehicle a recommended stop position for the passenger transport vehicle at the planned station stop, a recommended minimum passenger capacity of the passenger transport vehicle, a recommended arrival time of the passenger transport vehicle, a recommended departure time of the passenger transport vehicle, a recommended alternative mode of transportation, or a recommended special service to provide to a passenger.

16. The non-transitory computer readable medium of claim 15, wherein the recommended special service comprises a dispatch of wheelchair assistance for a passenger or a dispatch of a personal assistant for helping the passenger.

17. The non-transitory computer readable medium of claim 12, wherein the instructions further cause the one or more processors to receive reservation information associated with the passenger transport vehicle, wherein the situational status is further based on the reservation information.

18. The non-transitory computer readable medium of claim 12, the non-transitory computer readable medium further comprising a memory configured to store at least one of the in-vehicle status, the in-vehicle sensor data, the station status, the station sensor data, the situational status, or the movement control information.

19. An apparatus comprising:

a means for determining an in-vehicle status of a passenger transport vehicle based on in-vehicle sensor data about an interior of the passenger transport vehicle, wherein the passenger transport vehicle comprises one or more compartments;

a means for determining a station status at a planned station stop along a route for the passenger transport vehicle based on station sensor data about the planned station stop;

a means for determining a situational status based on the in-vehicle status and the station status; and a means for generating, based on the situational status, movement control information for the passenger transport vehicle, wherein the movement control information comprises:

an extension of a planned wait time duration for the passenger transport vehicle at the planned station stop; and dynamically publish a revised schedule of the passenger transport vehicle based on the extension of the planned wait time duration, wherein the revised schedule is published to a second vehicle so that it may change its priority along the route based on the revised schedule.

20. The apparatus of claim 19, the apparatus further comprising a means for storing at least one of the in-vehicle status, the in-vehicle sensor data, the station status, the station sensor data, the situational status, or the movement control information.

* * * * *